(12) United States Patent
Loce et al.

(10) Patent No.: US 8,467,089 B2
(45) Date of Patent: Jun. 18, 2013

(54) SYSTEMS AND METHODS FOR LINE WIDTH CONTROL AND PIXEL RETAGGING

(75) Inventors: Robert P. Loce, Webster, NY (US);
Beilei Xu, Penfield, NY (US); Stuart A. Schweid, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 1109 days.

(21) Appl. No.: 12/276,810

(22) Filed: Nov. 24, 2008

(65) Prior Publication Data

US 2010/0128314 A1    May 27, 2010

(51) Int. Cl.
*G06F 15/00*    (2006.01)
*G06K 9/40*    (2006.01)

(52) U.S. Cl.
USPC ............................................. 358/1.9; 382/266

(58) Field of Classification Search
None
See application file for complete search history.

(56) References Cited

U.S. PATENT DOCUMENTS

| | | | |
|---|---|---|---|
| 5,325,216 A | 6/1994 | AuYeung | |
| 5,459,828 A | 10/1995 | Zack et al. | |
| 5,528,733 A | 6/1996 | Luttmer | |
| 6,144,461 A | 11/2000 | Crean et al. | |
| 6,167,166 A | 12/2000 | Loce et al. | |
| 6,243,499 B1 | 6/2001 | Loce et al. | |
| 6,259,821 B1 | 7/2001 | Branciforte et al. | |
| 6,606,420 B1 * | 8/2003 | Loce et al. | 382/266 |
| 6,757,449 B1 | 6/2004 | Loce | |
| 6,944,341 B2 | 9/2005 | Loce et al. | |
| 2004/0257620 A1 | 12/2004 | Loce et al. | |
| 2007/0133020 A1 * | 6/2007 | Uejo et al. | 358/1.9 |
| 2007/0146386 A1 | 6/2007 | Loce et al. | |

* cited by examiner

*Primary Examiner* — Barbara Reinier
(74) *Attorney, Agent, or Firm* — Fay Sharpe LLP

(57) ABSTRACT

A system and method for processing a digital image for rendering are provided. The method includes performing one or more Line Width Control (LWC) operations on digital image data including pixels having pixel values representing gray levels and tag states providing information for specialized rendering techniques thereby changing one or more pixel values resulting in one or more inaccurate pixel tag states, identifying and reassigning one or more inaccurate pixel tag states for improving the rendering of the resultant digital image. An apparatus, such as an image processing system, capable of performing line width control and tag reassignment is also provided.

20 Claims, 15 Drawing Sheets

SYSTEMS AND METHODS FOR LINE WIDTH CONTROL AND PIXEL RETAGGING

BACKGROUND

Disclosed in embodiments herein are methods and systems for improving the quality of image rendering in digital printing systems and more particularly to image processing which reassigns tag state values for pixels in image regions affected by a line width control operation.

Recently, image paths for digital printers have been evolving to process contone data rather than binary image data. With the advent of inexpensive digital color printers, methods and systems of digital halftoning have become widely used. It is well understood that most digital printers operate in a binary mode, i.e., for each tonal separation, a corresponding spot is either printed or not printed at each specified location in a printed image. Digital halftoning controls the printing of tonal spots, where spatially averaging the printed spots by the human visual systems of one or more tonal separations provides the illusion of the required continuous tone (contone) gray levels.

Anti-aliasing in the context of digitizing line art and certain graphical image structures is a known method of using intermediate levels of intensity to achieve subpixel position of edges for several reasons including reduction or elimination of jaggies on the edges of lines and polygons, including text. Jaggies are typically most visible at the edges of sloped lines approaching horizontal or vertical. Anti-aliased images can be generated by capturing the image at a resolution greater than the final or desired output resolution, then reducing the resolution of the image by sub-sampling using an averaging process. A major benefit of anti-aliased images is that high contrast, saturated objects are surrounded with pixels possessing intermediate values that visually suggest the true, higher resolution position of object edges.

To optimally render anti-aliased pixels, it is beneficial to recognize pixels as anti-aliased, or not anti-aliased, and render them accordingly with specific rendering techniques. Metadata in the form of a tag, or tag state for each pixel can be used to enable such recognition and appropriate rendering. Pixel tag states can also be used to provide other information for specialized rendering techniques as well.

The field of digital printing has also employed numerous methods for line width modification in digital images. Some methods have been developed to correct for marking process shortcomings, such as inability to print narrow black lines, as taught by U.S. Pat. No. 4,791,679, entitled "Image Character Enhancement using a Stroke Strengthening Kernel", to Barski and Gaborski, U.S. Pat. No. 4,544,264, entitled "Fine Line Enhancement", to Bassetti, and U.S. Pat. No. 4,625,222, entitled "Interacting Print Enhancement Techniques", or to print narrow white lines as taught by U.S. Pat. No. 6,944,341 entitled "Loose Gray-Scale Template Matching For Image Processing Of Anti-Aliased Lines", to Loce, et at., among others. Other methods have been developed to achieve a certain darkness or lightness appearance, and may be referred to as "appearance tuning" or "appearance matching", such as those taught by U.S. Pat. No. 6,606,420 entitled "Method and apparatus for digital image darkness control in saturated image structures", to Loce, et al., U.S. Pat. No. 6,181,438, entitled "Method and Apparatus for Digital Image Darkness Control Using Quantized Fractional Pixels", to Bracco, et al., and U.S. Pat. No. 5,128,698 entitled "Boldness Control in an Electrophotographic Machine", to Crawford et al.

It has been found, however, that these line width modification operations can result in inaccurate or irrelevant pixel tag state information which can lead to image quality defects in subsequent rendering operations. The present systems and methods described herein address these problems and others providing improved image rendering.

BRIEF DESCRIPTION

An improved system and method of digital image rendering utilizing pixel tag information is provided.

In one aspect, a system performs at least one line width control operation moving the position of at least one edge of an image object within a digital image field, identifies pixels in the digital image data having inaccurate pixel tag information and reassigns the tag states for these affected pixels for improving image rendering.

In another aspect, a method is provided for performing at least one line width control operation moving the position of at least one edge of an image object within a digital image field, identifying pixels in the digital image data having inaccurate pixel tag information and reassigning the tag states for these affected pixels for improving image rendering.

DETAILED DESCRIPTION

Figure 1:
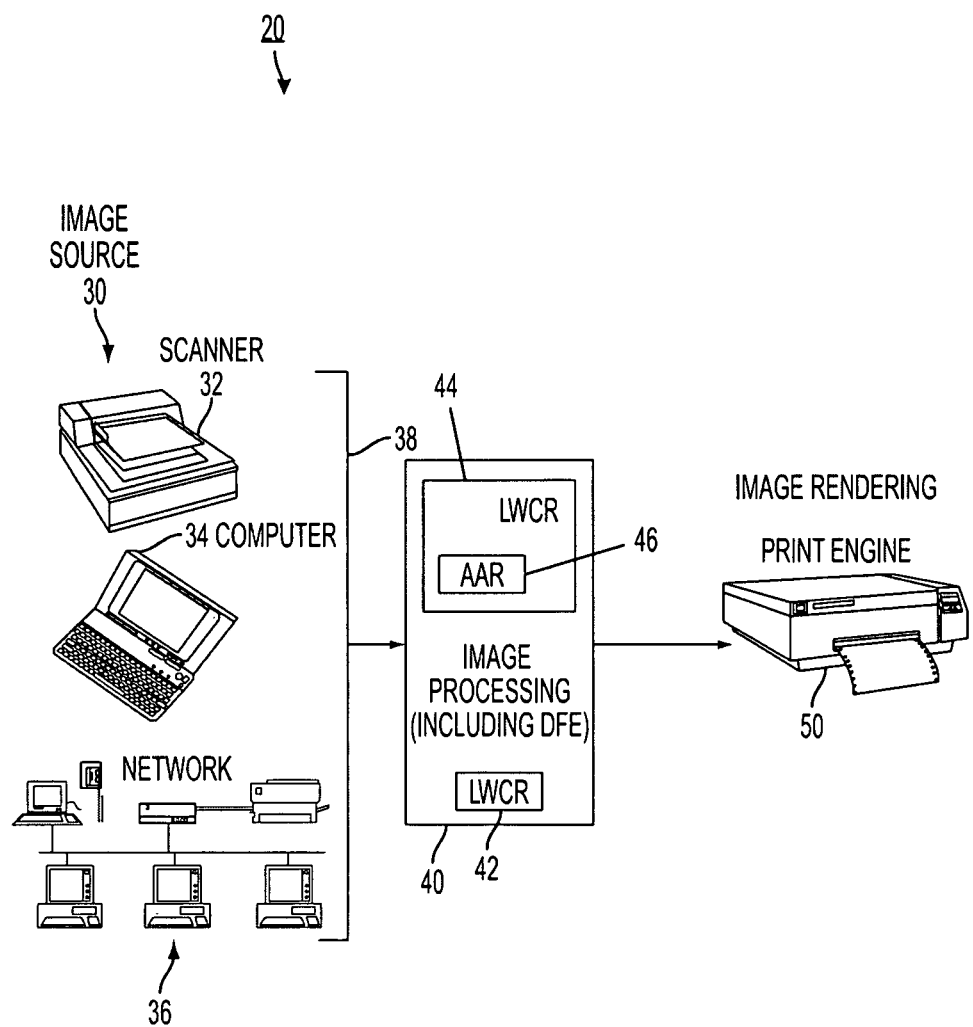
FIG. 1 is a block diagram of an exemplary embodiment of the systems for processing image data.

It is to be understood that the disclosure of the embodiments following describes a digital data technique which re-assigns tag values of pixels where a line width modification has been performed, so that those pixels are properly rendered to produce a desired printed appearance. In one embodiment, tags for anti-aliased pixels are modified using a look-up table approach and the pixels are subsequently rendered with pixel signals that yield a desirable appearance. For a general understanding of the present disclosure, reference is made to the drawings. In the drawings, like reference numerals have been used throughout to designate identical elements. In describing the present disclosure, the following term(s) have been used in the description.

The term "data" refers herein to physical signals that indicate or include information. An "image", as a pattern of physical light or a collection of data representing said physical light, may include characters, words, and text as well as other features such as graphics. A "digital image" is by extension an image represented by a collection of digital data. An image may be divided into "segments." each of which is itself an image. A segment of an image may be of any size up to and including the whole image. The term "image object" or "object" refers herein to identifiable structures within an image, such as a typographic character or symbol, photographic image, graphical object, or defined segment of an image.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. Although described herein as continuous tone processing, the present systems and methods apply equally as well to the processing of color images, wherein each separation is treated, effectively, as a gray scale or continuous tone image. Accordingly, references herein to the processing of continuous tone (contone) or gray scale images is intended to include the processing of color image separations as well. An operation performs "image processing" when it operates on an item of data that relates to part of an image.

A "high addressability pixel" can be a pixel comprising a plurality of high addressability pixel events, where, for example, each of the high addressability pixel events corresponds to a specific spatial placement of the writing spot with respect to the pixel and has a value that represents a property of the writing spot at that specific spatial placement. In binary high addressability pixels, for example, each high addressability pixel event is a single bit indicating whether the writing spot is "on" or "off" at the corresponding spatial placement. In general, high addressability, as used above, refers to a pixel grid where the spatial sampling of the grid is higher in one dimension than in the other dimension.

High addressability also commonly refers to an imaging method where the imaging device can position the writing spot with precision finer than the size of the writing spot. For instance a typical spot per inch (spi) high addressability system may operate with a 40 micron writing spot, an addressability of 600/inch in the direction perpendicular to the raster lines, and an addressability of 4800/inch in the direction of the raster lines.

High addressability also refers to writing an image with a higher sampling resolution than is input to the writing system. Similarly, high addressability also refers to a pixel sampling resolution that is higher than the input resolution in at least one dimension. For example, an input resolution of 300 spi may be converted to 600 spi and that resolution conversion is referred to as high addressability.

Systems that write high addressability images typically regulate a laser or similar writing device using clock modulation, amplitude modulation, pulse width modulation, pulse width position modulation or equivalent procedures. Imaging devices other than laser scanners can also employ high addressability. For instance, ink jet devices can have drop ejection rates that yield drop placements at high addressability and LED image bars can clock the LED "on" events at rates that are high relative to the spot size and diode spacing.

"Anti-aliasing" (AA) in the context of digitizing line art and certain graphical image structures is best known as a method of using intermediate levels of intensity to achieve subpixel position of edges for several reasons including reduction or elimination of jaggies on the edges of image objects such as lines and polygons, including text. In the context of the present disclosure, references to anti-aliased pixels will include pixels that are gray due to having undergone a computational or physical anti-aliasing process, as well as gray pixels that are at the edges of a gray image object.

Anti-aliased pixels can be detected enabling the anti-aliased pixels to be rendered in a manner distinguishable from that applied to continuous tone portions of an image. "Anti-aliased rendering" (AAR) refers to rendering anti-aliased pixels to a form that achieves a preferred appearance upon printing or display. In electronic printing, AAR typical renders AA pixels with a very high frequency line screen that may be biased toward an edge, or may be used to form a sharp outline. AAR typically uses the identification information supplied by an anti-aliasing and tagging method, examples include those taught by U.S. Pat. No. 6,144,461, entitled "Method for Generating Rendering Tags to Facilitate the Printing of Antialiased Images" to P. Crean and R. Loce; U.S. Pat. No. 6,243,499, entitled "Tagging of Antialiased Images," to R. Loce, et al., and U.S. Pat. No. 6,167,166, entitled "Method to Enable the Recognition and Rendering of Anti-aliased Images" by R. Loce, et al., which are hereby incorporated herein by reference in their entirety.

Digital "halftoning" refers to encoding methods that are used to reduce the number of quantization levels per pixel in a digital image, while maintaining the gray appearance of the image at normal viewing distance. Halftoning is widely employed in the printing and displaying of digital images. The need for halftoning encoding arises either because the physical processes involved are binary in nature or the processes have been restricted to binary operation for reasons of cost, speed, memory or stability in the presence of process fluctuations. Examples of such processes are most printing presses, ink jet printers, binary cathode ray tube (CRT) displays, and laser xerography. In most printing and displaying applications, the halftoned image is composed ideally of two gray levels, black and white. Spatial integration, plus higher level processing performed by the human visual system, of local area coverage of black and white pixels, provides the appearance of a gray level, or "continuous tone", image. The primary categories of halftoning methods include, clustered dot screening, dispersed dot screening, stochastic screening, line screening, error diffusion. Many halftone techniques readily extend to color and to quantization using more than two levels.

Referring to FIG. 1, depicted therein is an embodiment of a preferred digital imaging system shown generally at 20. In the system 20, image source 30 is used to generate digital image data 38 that is supplied to an image processing system 40 that may incorporate what is known in the art as a Digital Front End (DFE) The image source 30 may include scanner 32, computer 34, network 36 or any similar or equivalent image input terminal capable of generating the digital image data 38.

The image processing system 40 includes a Line Width Control and Tag Reassignment (LWCTR) module 42 as described in further detail below. The term module, as used herein, can refer to a logic process capable of being performed by one or more computers; it can also refer to one or more computational processors performing the associated logic as described in further detail below.

The image processing system 40 can also include one or more rendering modules, such as for example a Contone Rendering Module (CRM) 44. The rendering module(s) 44 perform rendering operations which can include halftoning, Anti-Alias Rendering (AAR), and others, that typically convert contone pixel values to binary or high addressable values that can be used to drive image forming devices 50, such as print engines including xerographic print engines, ink jet print heads, etc. The rendering operation(s) can utilize pixel tag information, and may operate on only portions of an image if so desired, to improve the visual quality of the printed image ultimately formed therefrom.

The systems and methods disclosed herein are directed towards aspects of the image processing system 40 and more specifically the LWCTR module 42. In particular, the intention of the teachings presented herein includes identifying pixels in digital image data having inaccurate tag state information resulting from at least one edge modification operation and reassigning the tag states for these affected pixels for improving image rendering. It will be appreciated by those skilled in the art that the rendering of an image into a printable or displayable output format may be accomplished at any of a number of locations, which herein is provided for by example only as occurring within the image processing system 40, or within the print engine 50.

The edge modification operation(s) described herein are referred to as Line Width Control (LWC) operation(s). A LWC operation is used here to generally refer to an image processing operation that moves the position of at least one edge of an image object within a digital image field. Examples of LWC operations can include, a line widening effect achieved when moving one or both edges of a line outward. Larger objects and more complex objects such as graphic features and text can undergo LWC by having edges moved inward or outward for purposes such as achieving a lighter or darker appearance, or compensation for some aspect of the physical printing process. Moving an edge may also be performed to modify features in an image, such as lengthening typographic serifs, and sharpening corners, as taught by U.S. Pat. No. 6,775,410, entitled "Image Processing Method for Sharpening Corners of Text and Line Art," by R. Loce, et al., and US Publication No. US20050129328A1, entitled "Corner Sharpening Of Text And Line Art In A Super Resolution Anti-Aliasing Image Path", by E. Saber, et al., which are hereby incorporated herein by reference in their entirety.

The exemplary embodiments described herein include reassigning tag states of pixels in image regions affected by LWC processing and can be referred to as Line Width Control and Tag Reassignment (LWCTR). Using LWCTR, tag states can be reassigned for pixels whose values were modified and/or for pixels whose neighboring pixel values were modified in LWC operations.

Figure 2A:
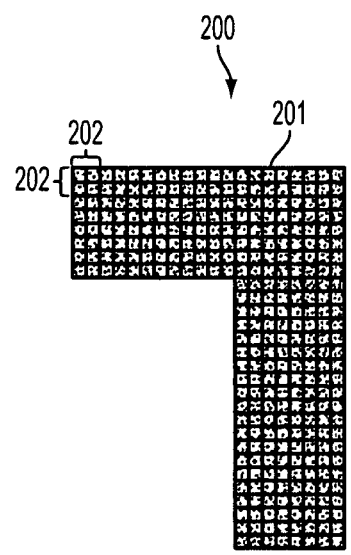
FIG. 2A depicts a portion of a digital image of the letter "T" rasterized to a high resolution.
Figure 2B:
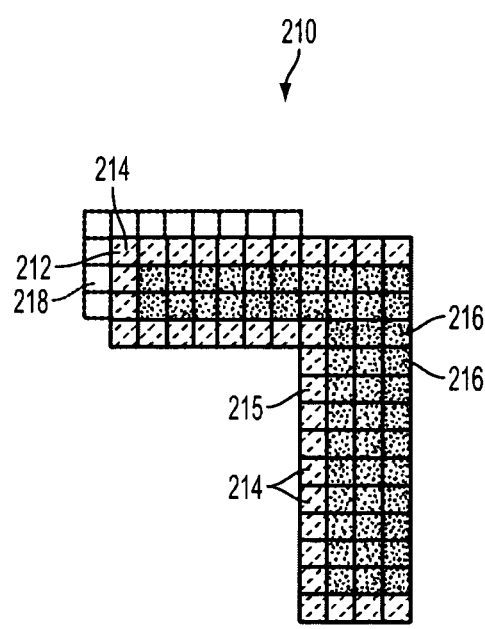
FIG. 2B depicts a contone anti-aliased image created at a lower resolution from of the image of FIG. 2A.
Figure 2C:
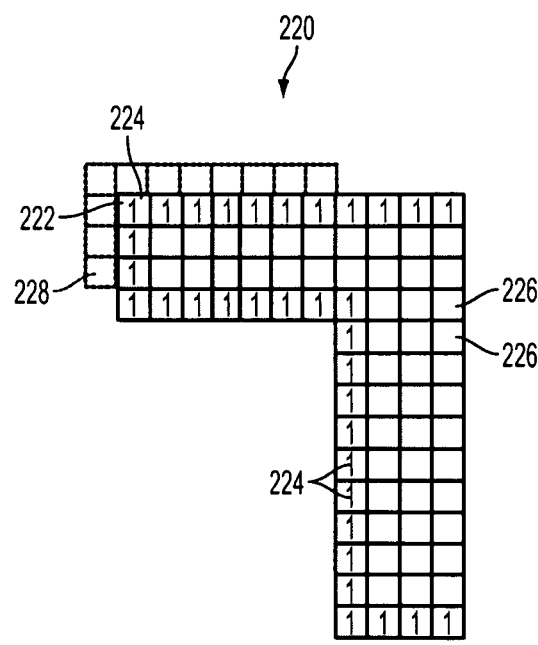
FIG. 2C depicts a tag plane providing pixel tag state information for the image of FIG. 2B.

Referring now to FIGS. 2A-2C, a portion of a digital image of the letter "T" is shown to illustrate super-resolution anti-aliasing, anti-aliased tagging, and anti-aliased rendering employed in image processing paths. FIG. 2A shows a high resolution binary unrendered image 200 after rasterizing, also known as RIPing, in the DFE 40 to high resolution of 1200× 1200 spots per inch (spi), one of which is shown at 201. FIG. 2B shows a contone anti-aliased unrendered image 210 at 600 spi that the DFE 40 creates from the 1200 spi image 200. Pixel 212 is formed from several pixels 202 of the high resolution image 200 of FIG. 2A. One process used in super-resolution anti-aliasing is a simple averaging of neighboring pixels, which produces gray edge pixels 214 where image object edges 215 are not perfectly aligned with the output low resolution grid. These gray edge pixels 214 have intermediate pixel values which lie between the pixel values of the background pixels 218 and the interior pixels 216 disposed within the image 210. The gray edge pixels 214 are recognized as anti-aliased pixels, and tagged as such by providing these pixels with tag states indicating that they are anti-aliased pixels as taught, for example, by U.S. Pat. No. 6,144,461, entitled "METHOD FOR GENERATING RENDERING TAGS TO FACILITATE THE PRINTING OF ANTI-ALIASED IMAGES", to Crean and Loce; U.S. Pat. No. 6,167,166, entitled "METHOD TO ENABLE THE RECOGNITION AND RENDERING OF ANTIALIASED IMAGES", to Loce et al.; and US Publication No. 2007/0146386, entitled "ANTI-ALIASED TAGGING USING LOOK-UP TABLE EDGE PIXEL IDENTIFICATION", to Loce et al., which are hereby incorporated herein by reference in their entirety.

The tag state information for the pixels 212-218 of image 210 can be provided in a tag plane 220 of FIG. 2C having tag values in locations 222, 224, 226, and 228 corresponding to pixels 212, 214, 216, and 218 of FIG. 2B, respectively. For example the tag states, as shown by 1's at 224, can be used to identify pixels 214 as anti-aliased gray edge pixels. The contone Anti-Aliased digital image 210 and the tag data 220 are both provided to an image processing module, such as for example the Contone Rendering Module (CRM) 44 which utilizes a AAR module 46 performing Anti-Aliased Rendering (AAR).

During AAR, the CRM 44 utilizes the tag information to render those gray edge pixels 214 with shifted versions of a 600 lpi line screen at 4800×600 spi resolution, thereby producing line art with sharp edges. Due to the anamorphic resolution (4800×600), the image edges 215 are produced by packing the edge pixels normally in one orientation and using high addressable halfbitting in the other direction as taught, for example, by U.S. Pat. No. 5,325,216 entitled "RASTER OUTPUT SCANNER WITH SUBPIXEL ADDRESSABILITY", to AuYeung; U.S. Pat. No. 5,528,733 entitled "APPARATUS FOR RASTERIZING IMAGE DATA IN OUTLINE FORM", to Luttmer; and U.S. Pat. No. 5,459,828 entitled "OPTIMIZED SCALING AND PRODUCTION OF RASTER FONTS FROM CONTOUR MASTER FONTS", to Zak and Nelson, which are hereby incorporated herein by reference in their entirety.

Figure 3A:
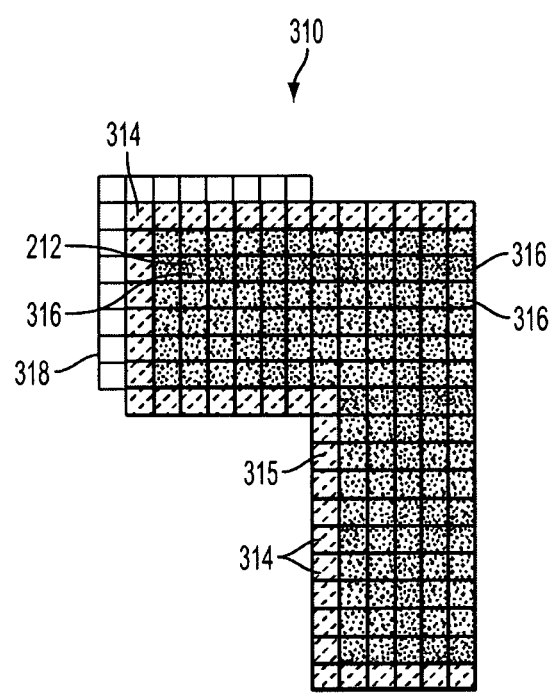
FIG. 3A depicts the result of a line width control operation performed on the image of FIG. 2B.
Figure 3B:
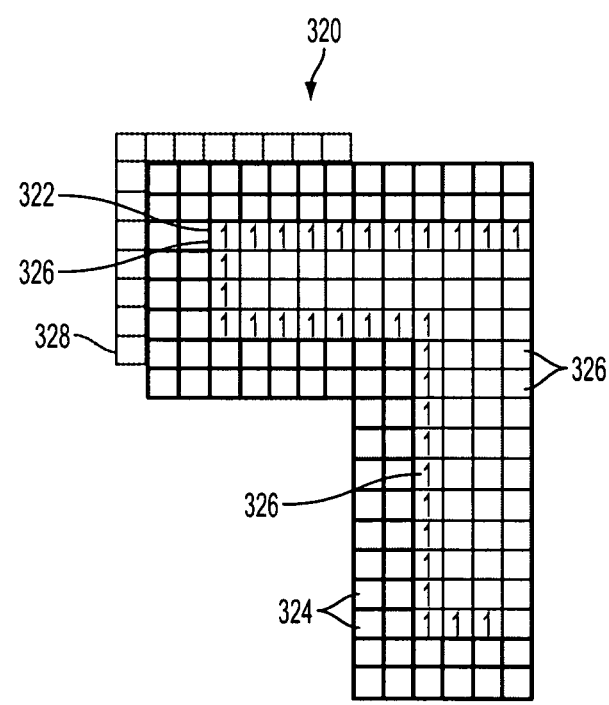
FIG. 3B depicts a tag plane illustrating inaccurate pixel tag state information for the image of FIG. 3A provided the line width control operation.

A line widening LWC operation applied to the image 210 of FIG. 2B by a conventional LWC module which extends the image edges 215 outwards by 2 pixels results in the image 310 of FIG. 3A having newly formed edge pixels 314 disposed between interior image pixels 316, having pixel values representative of such, and background pixels 318 having pixel values suitably different from the pixel values of the interior image pixels. The image tag plane 320, shown in FIG. 3B, of the modified image has not been modified by the LWC operation, so its values are the same as those of the original tag plane 220. FIG. 3B illustrates the loss of correspondence between the original edge pixel tag values 326 and the preferred locations 324 for edge pixel tags within the tag plane 320. As a result of the LWC operation, the new edge pixels 314 have pixel tag states 324 which are inaccurate, not properly indicating that these pixels are anti-aliased edge pixels. Similarly, as a result of the LWC operation, the original edge pixels 214 have changed from edge pixels to interior pixels 316 and thus also have inaccurate tag states 326 indicating they are anti-aliased edge pixels.

Figure 3C:
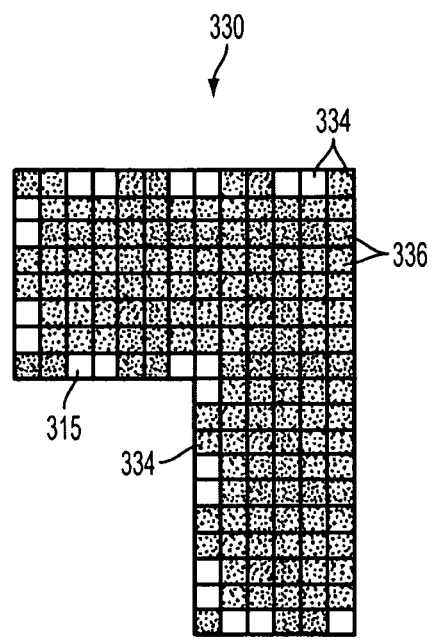
FIG. 3C depicts a rendering of the image of FIG. 3A to binary values using the inaccurate tag values of FIG. 3B.

When rendering the image 310 modified by the LWC operation without revising the corresponding tag plane 320, the gray edge pixels in FIG. 3A may be rendered by a halftoning algorithm, rather than the desired Anti-Aliased Rending (AAR) module 46, which results in the rendered image 330 shown in FIG. 3C having scalloped image edges 334. A 212 cpi halftone was used in this example, and the undesirable scalloping would be even more pronounced for a lower frequency halftone.

Figure 4:
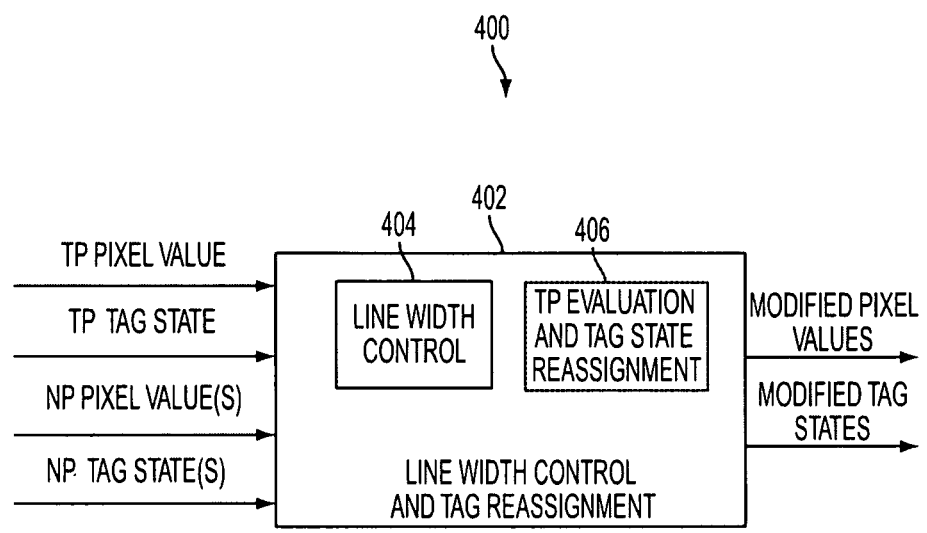
FIG. 4 is a generalized schematic of the line width control and tag reassignment module disclosed herein.

Referring now to FIG. 4, a diagram depicting the data flow in an example embodiment is shown generally at 400. The contone digital image data 38 is provided to image processing system 40. In particular, the data flow of FIG. 4 depicts the portion of data that would be received from a digital front end (DFE) system having processed the raster image data, where the contone data 38 is then supplied to a LWCTR module 402 similar to 42 in FIG. 1 described above. The LWCTR module 402 includes a Line Width Control module 404 performing a LWC operation, examples of which are provided below. The LWCTR module 402 also includes a target pixel evaluation and tag state reassignment module 406, as described below.

Figure 6A:
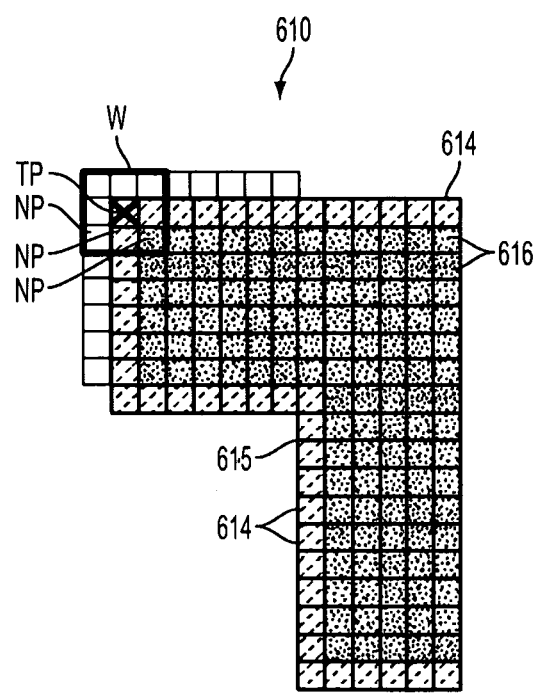
FIG. 6A depicts the processing of the anti-aliased image in FIG. 2B undergoing line width control and tag reassignment as disclosed herein.

The LWCTR module 402 can process the image data 38 using data groups, referred to as a window W shown in FIG. 6A. Each group can include the pixel value and tag state(s) for a Target Pixel (TP) and its surrounding neighboring pixels (NPs). The neighbor pixels can be described as a set of pixels with a defined set of coordinate displacements from the target pixel, and the window forms a grid of image pixels such as a 5×5, 3×7, or 7×7, etc. grid including the neighbor pixels and target pixel as taught by US Publication No. 2007/0146386 to Loce et al. previously incorporated by reference herein. The neighbor pixels can be the pixels immediately adjacent to the target pixel referred to as the nearest neighbor pixels (NNPs), if so desired. In other embodiments, the neighbor pixels can include a larger group of pixels disposed within the vicinity of the TP as defined by the predetermined set of coordinate displacements. The window encompassing the TP and NPs can be centered about the TP, or it may not be, if so desired. The window W is moved over the image to form a plurality of data groups, such that each data group corresponds to a different window location over the image. Each data group therefore includes data for a different image pixel designated as the target pixel grouped together with its corresponding neighboring pixel data. An entire image, or only portions of an image, may be processed in the LWCTR module 402 in this manner.

As shown at the left side of FIG. 4, a data group for each target pixel is provided to the LWCTR module 402 including a TP pixel value providing a numerical representation of the target pixel gray level, typically falling within the range of 0 to 255, though other suitable ranges may be used. A TP tag can also be provided. The TP tag is metadata providing additional information about the target pixel which is used in the image processing system 40 for providing improved image rendering. The TP tag which can also be referred to as the tag state, tag data, or tag value for the target pixel, provides information indicating if the pixel has been anti-aliased, was affected by color-trapping, was part of a line, an edge, a border, or a background, etc. which can be used for particular rendering operations or processing. As indicated above, a pixel's tag state can become inaccurate as a result of processing in a Line Width Control (LWC) operation.

The LWCTR module 402 can also receive NP pixel values for the TP data group providing gray level information for the neighbor pixels, the number of which can be predetermined as described above, and providing NP tag states including tag information, as described above.

The LWCTR module 402 produces modified pixel values and modified tag states for the image pixels, as shown at the right side of FIG. 4, by performing the Line Width Control 404, and TP evaluation and tag state reassignment 406 which revises or reassigns inaccurate tag states for improving the subsequent rendering of the digital image in rendering operations utilizing pixel tag state information. Various embodiments of LWCTR are described herein, some of which include TP evaluation and tag state reassignment operations which utilize the TP information and others which also utilize the NP information.

Figure 5A:
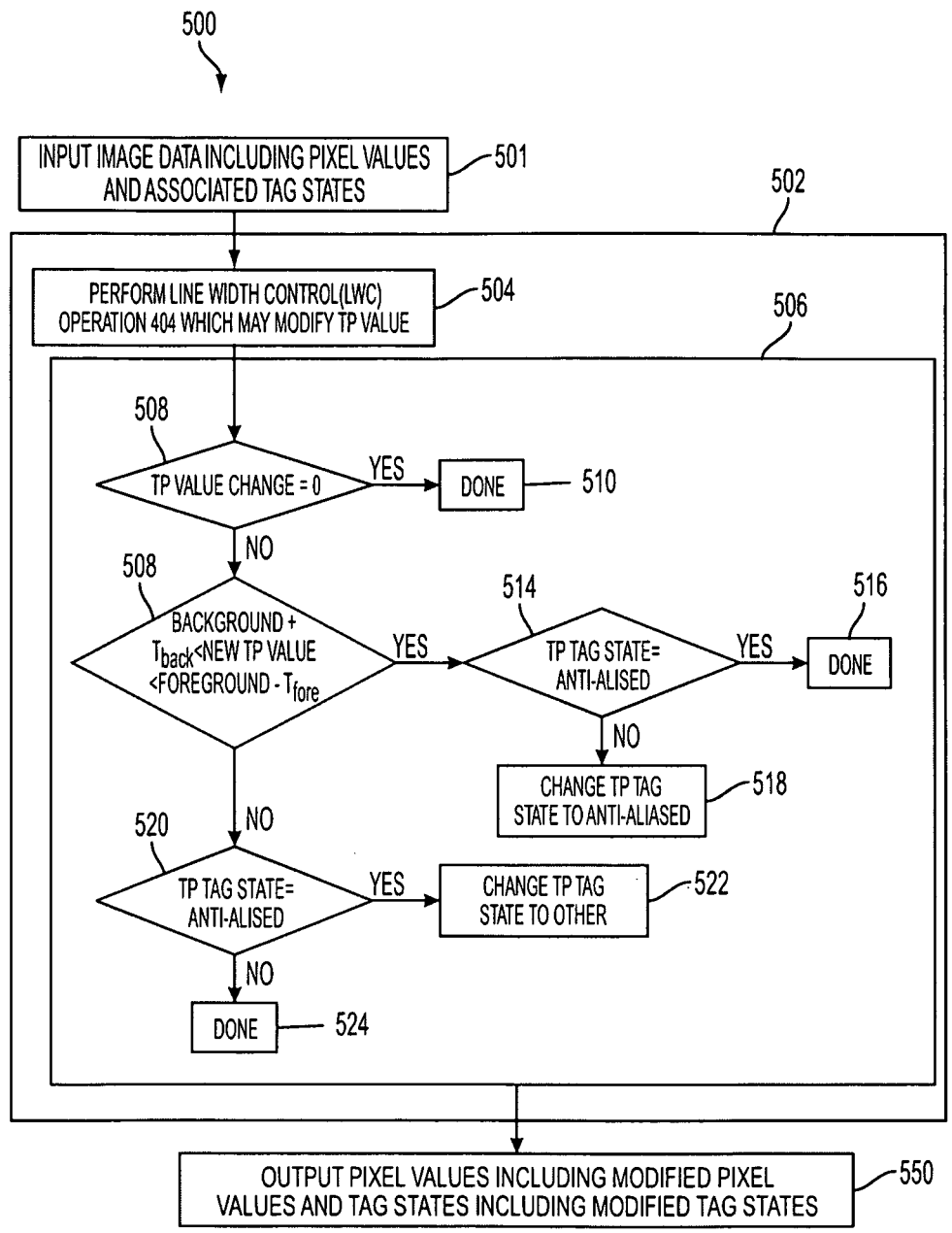
FIG. 5A is a flow chart illustrating an embodiment of the systems and methods of line width control and tag reassignment disclosed herein.

Referring now to FIG. 5A, an embodiment of the operational logic flow of the LWCTR module 402 including LWC 404 and TP evaluation and tag state reassignment 406 is shown generally at 500 for image data utilizing anti-aliased tags and "other" tags which are not anti-aliased tags. Examples of these "other" tags can include, but are not limited to, tags which provide rendering information for rendering the pixel like the image background referred to as background tags, or rendering the pixel like the image foreground referred to as foreground tags, or rendering the pixel like a pictorial image referred to as pictorial tags, etc. Input image data including pixel values and associated tag states 501 are provided to the LWCTR module 502. For example, a window W of image data for a portion of a digital image of the letter "T" 610 shown in FIG. 6A is provided as a data group. The window data group W includes a target pixel TP, indicated by an "X", and its neighbor pixels NP which are determined in a manner as described above.

Figure 6B:
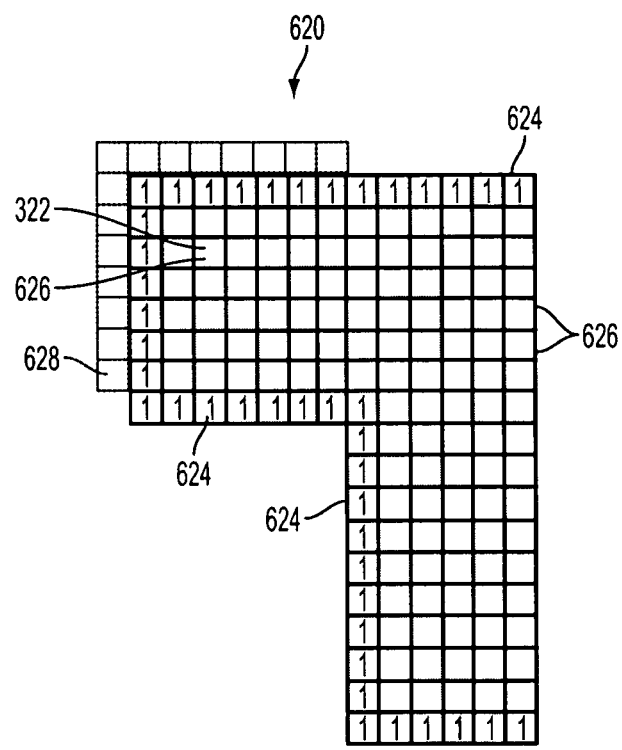
FIG. 6B depicts a tag plane for the image of FIG. 6A providing corrected pixel tag states for the image of FIG. 6A.

A line width control operation which may modify the target pixel value is performed on the data group W at 504. The value of the target pixel can be changed according to the logic of the line width control operation 504 which modifies an edge, or increases the width of a line, etc., in the image. In the example provided in FIGS. 6A-6C, the TP pixel value is changed from a background pixel value to an edge pixel value as part of a LWC operation moving the image edge outwards by 2 pixels. As a result of the LWC operation, the modified digital image 610 includes gray edge pixels 614 at the image edge 615, disposed between interior pixels 616 having pixel values consistent with interior of the image and background pixels 618 having pixel values consistent with the background.

The modified digital image data is then processed by a TP evaluation and tag reassignment module 506. The TP pixel value is evaluated at 508 to determine if it has changed as a result of the LWC operation 504, such as by comparing it to the pixel value for that pixel prior to the step 504, which can be stored prior and used for comparison. If no change in pixel value occurs, the processing of the TP is concluded at 510. If the TP value has changed, it is determined if the modified TP value falls within a range of pixel values which are considered to be gray edge pixels at 512. In the printing example provided, in which the image 610 will be a portion of the printed letter "T" produced on a lighter background using 8 bits/pixel to quantify the gray level gray level values ranging from 0 calling for no toner at that pixel (thereby producing a white pixel) to 255 calling for toner at that pixel (thereby producing a printed spot), this range of pixel values can be described being greater than the pixel value(s) of the background pixels, referred to as "Background", plus a predetermined threshold value, referred to $T_{back}$ and less than pixel value(s) of the foreground pixels, referred to as "Foreground", minus a predetermined threshold value, referred to $T_{fore}$. Suitable values of $T_{back}$ and $T_{fore}$ can be chosen for each application. In super resolution anti-aliasing, groups of pixels, such as pixels 202 in FIG. 2A, are being averaged to obtain anti-aliased pixel values, such as for pixel 212 described above. If the group is 2×2 in size, AA pixel values will be approximately 0, 64, 128, 191. For these numbers provided in this example, example values for $T_{back}$ and $T_{fore}$ can be about 32 and 255−32=223, respectively, though it should be appreciated that other threshold values within a range about 8 to 64, and 192 to 255, respectively, can be used. Further these values are provided for by way of example, and other thresholds falling in ranges specific to the given application may also be used.

If it is determined at 512 that the TP value does fall within the range of pixel values for gray edge pixels, it is determined at 514 if the TP tag state is the anti-aliased value. If YES, the TP tag state value is still correct/accurate and the processing of the TP is done at 516. If NO, the TP tag state is changed to the anti-aliased tag state value at 518 and the processing of the TP is done. If it is determined at 512 that the TP value does not fall within the gray edge pixel value range, it is determined if the TP tag state is anti-aliased at 520. If YES, the TP tag state is incorrect/inaccurate and the TP tag state is changed to "other" at 522. If NO, the TP tag state does not contain an inaccurate anti-aliased tag value and processing is done at 524. The other image pixels are processed in a similar manner as the window W is moved over the image and each pixel becomes the TP.

Figure 6C:
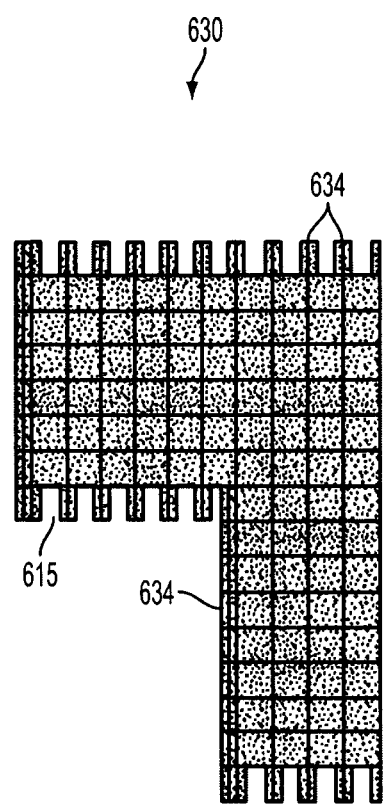
FIG. 6C depicts the anti-aliased image of FIG. 6A after processing with anti-aliased rendering signals.

After the LWCTR logic concludes, output pixel values including modified pixel values, and tag states including modified tag states are produced at 526 for provided improved image rendering. This process is continued until all target pixels in the input digital image are processed thereby correcting the incorrect tag states for the new edge pixels 614 to the anti-aliased state as shown at 624 in FIG. 6B. Reassigning the tag states to correct tag states made inaccurate by LWC operations in this manner enables the digital image 610 to be rendered more accurately, such as by using Anti-Aliased Rendering for the edge pixels 634, producing a rendered image 630 with smoother, more visually pleasing edges 635 as shown in FIG. 6C.

Figure 5B:
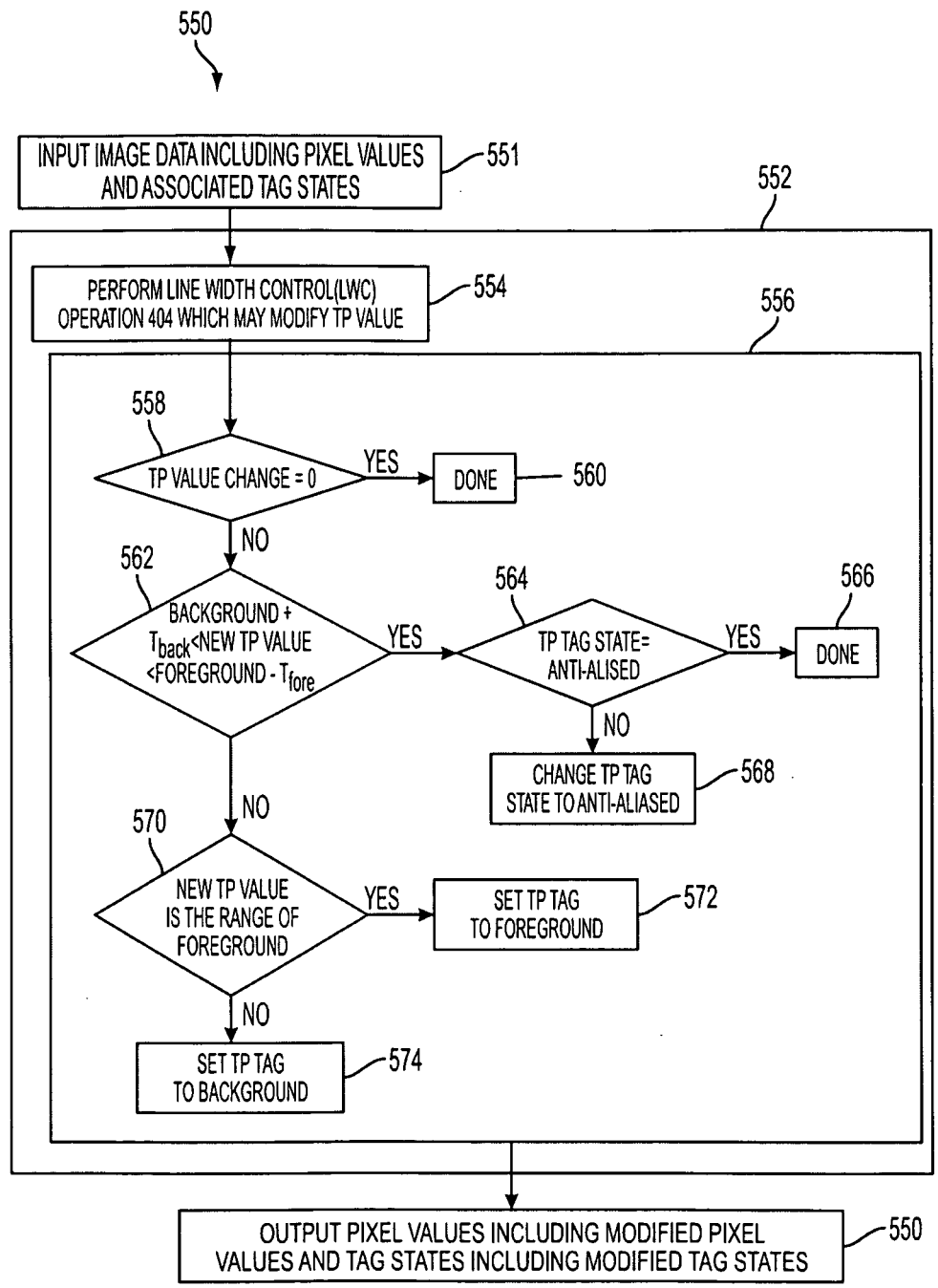
FIG. 5B is a flow chart illustrating an embodiment of the systems and methods of line width control and tag reassignment disclosed herein.

Referring now to FIG. 5B, another embodiment of the operational logic flow of the LWCTR module 402 including LWC 404 and TP evaluation and tag state reassignment 406 is shown generally at 550. Input image data including pixels values and associated tags states 551 are provided to the LWCTR module 552. The tag state information includes anti-alias tags, and foreground and background tags are also used.

A line width control operation which may modify the target pixel value is performed on the data group W at 554. The value of the target pixel can be changed according to the logic of the line width control operation 554 which modifies an edge, or increases the width of a line, etc., in the image.

The modified digital image data is then processed by a TP evaluation and tag reassignment module 556. The TP pixel value is evaluated at 558 to determine if it has changed as a result of the LWC operation 554 in a similar manner as described above, and if no change in pixel value occurs, the processing of the TP is concluded at 560. If the TP value has changed, it is determined if the modified TP value falls within a range of pixel values which are considered to be gray edge pixels at 562 in a similar manner as described above. If it is determined at 562 that the TP value does fall within the range of pixel values for gray edge pixels, it is determined at 564 if the TP tag state is the anti-aliased value. If YES, the TP tag state value is still correct/accurate and the processing of the TP is done at 566. If NO, the TP tag state is changed to the anti-aliased tag state value at 568 and the processing of the TP is done. If it is determined at 562 that the TP value does not fall within the gray edge pixel value range, it is determined at 570 if the TP value is in the range of the pixel values of the foreground. The foreground pixel value range can be determined and stored for use in 570. If YES, the TP tag state is incorrect/inaccurate and the TP tag state is set to foreground at 572. If NO, the TP tag state is set to background at 574. The other image pixels are processed in a similar manner. After the LWCTR logic concludes, output pixel values including modified pixel values, and tag states including modified tag states are produced at 576 for improved image rendering in rendering operations utilizing pixel tag state information, as described above.

Figure 7A:
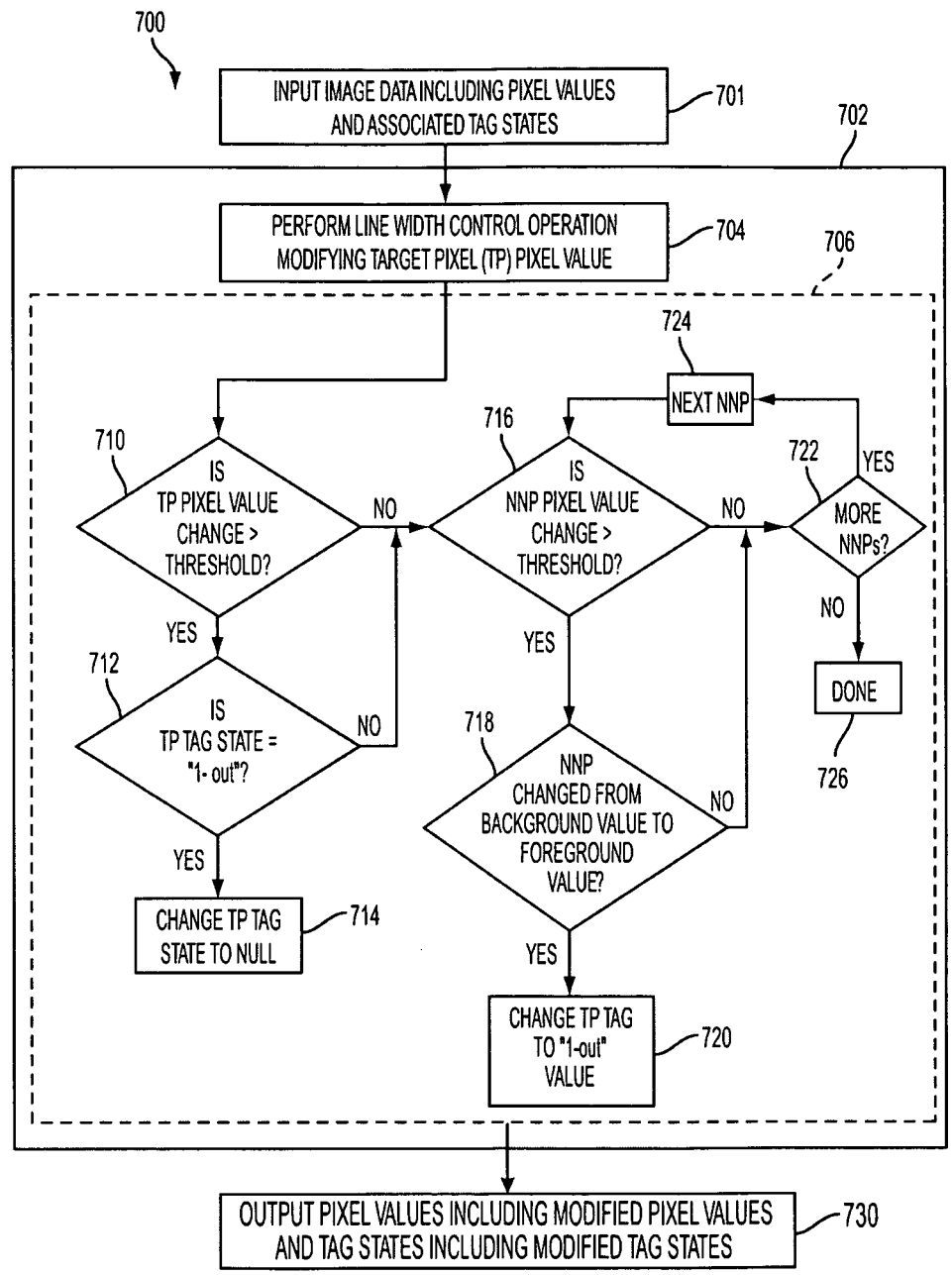
FIG. 7A is a flow chart illustrating another embodiment of the systems and methods of line width control and tag reassignment disclosed herein.

Referring now to FIG. 7A, another embodiment of the operational logic flow of the LWCTR module 402 is shown generally at 700. Input image data including pixels values and associated tags states 701 are provided to the LWCTR module 702. At least some of the tag states provide information as to the pixel's distance from an edge, such as a "1-out" tag value indicating the pixel is 1 pixel outside of the image edge.

A line width control operation modifying the target pixel value is performed at 704. The value of the target pixel is changed according to the logic of the line width control operation 704 which modifies an edge or increases the width of a line, etc., in the image.

After the line width control operation is performed at 704 TP evaluation and tag state reassignment is performed at 706 to correct, or reassign, inaccurate tag states resulting from the LWC operation. The TP is evaluated at 710 to determine if the LWC operation 704 changed the TP pixel value more than a predetermined threshold. An example threshold value of 32 can be used, however, the threshold can depend on the specific application.

If the TP pixel value was changed by more than a predetermined threshold, as determined at 710, the TP tag state is evaluated at 712 to determine if the TP was located just on the outside of the original edge prior to the LWC operation, referred to as a "1-out" pixel. If the TP was an "1-out" pixel and the TP pixel value was changed by more than the threshold, the TP tag state is changed to a null value at 714 to correct inaccurate tag data for rendering the TP.

If the TP pixel value was determined not to have changed more than the threshold at 710, or the TP tag state was not a "1-out" value at 712, the NPs are evaluated. A NP in the form of a NNP is chosen and it is determined if the NNP pixel value was changed more than a threshold value at 716. If the change in NNP pixel value was greater than a threshold, it is determined if the NNP changed from a background state to a foreground state at 718, such as by comparing the NNP pixel value to background pixel values and foreground pixel values. If so, the TP tag state is changed to an "1-out" value at 720 to provide accurate tag data for rendering.

If the NNP pixel value was determined not to have changed more than the threshold at 716, or the NNP was not changed from a background state to a foreground state at 718 it is determined if more NNP exist at 722. If no more NNPs exist the TP evaluation and tag state reassignment is done at 726. If more NNPs exist, the next NNP is chosen at 724 and evaluated by repeating steps 716, 718, and 720 to correct the TP tag state information, until it is determined that no more NNPs for the TP exist at 722.

Output pixel values including modified pixel values, and tag states including modified tag states are produced at 750 for provided improved image rendering in rendering operation which utilize pixel tag state information. This process is continued until all target pixels in the input digital image are processed to correct or reassign inaccurate tag values for the digital image for improved rendering as described above.

Figure 7B:
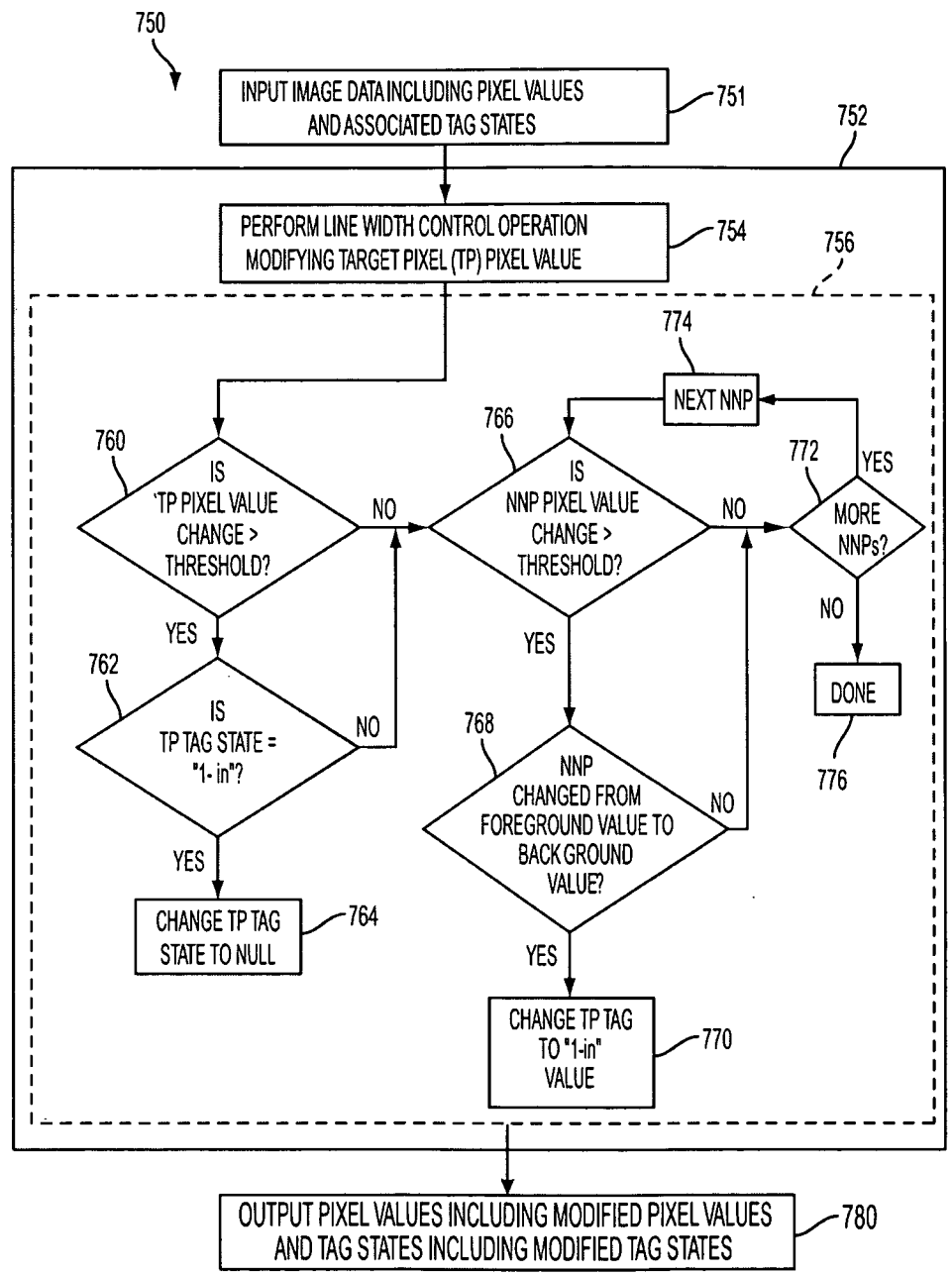
FIG. 7B is a flow chart illustrating another embodiment of the systems and methods of line width control and tag reassignment disclosed herein.

Referring now to FIG. 7B, another embodiment of the operational logic flow of the LWCTR module 402 is shown generally at 750. Input image data including pixels values and associated tags states 751 are provided to the LWCTR module 752. At least some of the tag states provide information as to the pixel's distance from an edge in the form of a "1-in" tag state value indicating the pixel is one pixel inside the image from the image edge.

A line width control operation modifying the target pixel value is performed at 754. Next, TP evaluation and tag state reassignment is performed at 756 to correct, or reassign, inaccurate tag states resulting from the LWC operation. The TP is evaluated at 760 to determine if the LWC operation 754 changed the TP pixel value more than a predetermined threshold, such as for example by a value of 32 as described above.

If the TP pixel value was changed by more than a predetermined threshold as determined at 760, the TP tag state is evaluated at 762 to determine if the TP was located just on the inside of the original edge prior to the LWC operation, referred to as an "1-in" pixel. If the TP was an "1-in" pixel and the TP pixel value was changed by more than the threshold, the TP tag state is changed to a null value at 764 to correct inaccurate tag data for rendering the TP.

If the TP pixel value was determined not to have changed more than the threshold at 760, or the TP was not an "1-in" pixel as determined at 762, the NPs, in the form of the NNPs, are evaluated. A NNP is chosen and it is determined if the NNP pixel value was changed more than a threshold value at 766. If the change in NNP pixel value was greater than a threshold, it is determined if the NNP changed from a foreground to a background value at 768, such as by comparing the NNP pixel value to background pixel values and foreground pixel values. If YES, the TP tag state is changed to a "1-in" value at 770 to provide accurate tag data for rendering.

If the NNP pixel value was determined not to have changed more than the threshold at 766, or the NNP was not changed from a foreground state to a background state at 768 it is determined if more NNP exist at 772. If no more NNPs exist the TP evaluation and tag state reassignment is done at 776. If more NNPs exist, the next NNP is chosen at 774 and evaluated by repeating steps 766, 768, and 770 to correct the TP tag state information, until it is determined that no more NNP for the TP exist at 772.

Output pixel values including modified pixel values, and tag states including modified tag states are produced at 780 for provided improved image rendering in rendering operation which utilize pixel tag state information. This process is continued until all target pixels in the input digital image are processed to correct or reassign inaccurate tag values for the digital image for improved rendering. Similar processing for "2-in" pixels, "2-out" pixels, etc. can be contemplated. For pixels that are farther away from an edge than 1-in and 1-out, more distant neighboring pixels (NPs) and their tag states may be used in the evaluations. That is, NPs other than just NNPs must be examined in the re-tagging decisions.

The LWCTR module 42, by the interactions of the Line Width Control module 404 modifying pixel values in LWC operations and the TP Evaluation and tag state reassignment module 406 correcting or reassigning resulting inaccurate pixel tag states provides for improved rendering of digital images in subsequent conventional rendering operations which utilize pixel tag state information for specialized rendering techniques. Further examples of such corrections which can be performed by the LWCTR module 42 can include: revising one or more pixel tag states to either foreground tag state values or null states when anti-aliased edge pixels are changed to foreground pixel values; revising one or more pixel tag states to either background tag state values or null states when anti-aliased edge pixels are changed to background pixel values; revising one or more pixel tag states to anti-aliased tag states when pixels having foreground or background pixel values neighboring anti-aliased pixels are changed to intermediate pixel values; and revising pixel tag states providing inaccurate distance to edge information for pixels resulting from changes to the edge made during a LWC operation using information on how much the image edge was moved.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for processing a digital image for rendering, the method comprising:
    receiving digital image data including pixels having pixel values representing gray levels, at least some of the pixels having tag states;
    performing one or more Line Width Control (LWC) operations on the digital image data moving at least one edge of an image object and changing one or more pixel values resulting in one or more inaccurate pixel tag states;
    performing pixel evaluation identifying one or more pixels having inaccurate tag states; and
    revising one or more inaccurate pixel tag states for improving the rendering of the digital image.

2. The method of claim 1 further comprising rendering a portion of the image using halftoning and rendering a portion of the image having anti-aliased pixel tag states using anti-aliased rendering.

3. The method of claim 1 wherein the revising includes reassigning pixel tag states for pixels having neighbor pixel (NP) pixel values changed by the one or more LWC operations.

4. The method of claim 3 wherein the revising includes reassigning pixel tag states for pixels having nearest neighbor pixel (NNP) pixel values changed by the one or more LWC operations.

5. The method of claim 1 wherein the revising includes reassigning pixel tag states to anti-aliased pixel tag states when pixels neighboring anti-aliased pixels and having foreground or background pixel values that are changed to intermediate pixel values in the one or more LWC operations.

6. The method of claim 1 wherein the revising includes reassigning pixel tag states to provide accurate distance to edge information for pixel tag states having inaccurate distance to edge information resulting from changes to an image edge made in the one or more LWC operations.

7. A method of digital image Line Width Control comprising:
    receiving digital image data including pixels having pixel values representing gray levels, at least some of the pixels having tag states;

performing a Line Width Control (LWC) operation on the digital image data changing one or more pixel values resulting in one or more inaccurate pixel tag states;

performing pixel evaluation and tag state reassignment reassigning anti-aliased pixel tag states for one or more pixels having inaccurate pixel tag states; and outputting the digital image data having accurate pixel tag states for the rendering of the digital image.

8. An apparatus for processing images, comprising;

an image processing system performing a Line Width Control (LWC) operation on digital image data including pixels having pixel values representing gray levels, at least some of the pixels having tag states, the LWC operation moving at least one edge of an image object and changing one or more pixel values resulting in one or more inaccurate pixel tag states, the image processing system performing pixel evaluation and tag state reassignment identifying one or more pixels having inaccurate tag states and reassigning the tag states for the one or more pixels having inaccurate pixel tag states.

9. The apparatus of claim 8 further comprising the image processing system rendering a portion of the image in a first rendering operation utilizing pixel tag state information and rendering a portion of the image in a second rendering operation not utilizing pixel tag state information.

10. The apparatus of claim 8 further comprising the image processing system rendering a portion of the image using halftoning and rendering a portion of the image having anti-aliased pixel tag states using anti-aliased rendering.

11. The apparatus of claim 8 wherein the image processing system performing pixel evaluation and tag state reassignment reassigns pixel tag states for pixels having neighbor pixel (NP) pixel values changed by the LWC operation.

12. The apparatus of claim 11 wherein the image processing system performing pixel evaluation and tag state reassignment reassigns pixel tag states for pixels having nearest neighbor pixel (NNP) pixel values changed by the one or more LWC operations.

13. The apparatus of claim 8 wherein the image processing system performing pixel evaluation and tag state reassignment reassigns pixel tag states to "1-in" or from "1-in", or reassigns pixel tag states to "1-out" or from "1-out".

14. The apparatus of claim 8 wherein the image processing system performing pixel evaluation and tag state reassignment reassigns pixel tag states to anti-aliased pixel tag states when pixels neighboring anti-aliased pixels and having foreground or background pixel values that are changed to intermediate pixel values in the LWC operation.

15. The apparatus of claim 8 wherein the image processing system performing pixel evaluation and tag state reassignment reassigns pixel tag states to provide accurate distance to edge information for pixel tag states having inaccurate distance to edge information resulting from changes to an image edge made in the LWC operation.

16. The method of claim 1 wherein the revising comprises at least one of reassigning pixel tag states to anti-aliased pixel tag states and reassigning pixel tag states from tag states which are anti-aliased pixel tag states to tag states which are not anti-aliased pixel tag states.

17. The method of claim 1 wherein the revising comprises at least one of reassigning pixel tag states to "1-in" pixel tag states or from "1-in" pixel tag states, and reassigning pixel tag states to "1-out" pixel tag states or from "1-out" pixel tag states.

18. The method of claim 1 further comprising:
wherein the performing pixel evaluation includes determining that a pixel has a pixel value that is within a range of pixel values for gray edge pixels, and determining that the tag state for the pixel is not an anti-aliased value; and
wherein the revising includes changing the tag state for the pixel to an anti-aliased tag state value.

19. The method of claim 1 further comprising:
wherein the performing pixel evaluation includes determining that a pixel has a pixel value that is not within a range of gray edge pixel values, and determining that the tag state for the pixel is an anti-aliased value; and
wherein the revising includes changing the tag state for the pixel to a tag state which is not an anti-aliased tag state.

20. The method of claim 1 further comprising:
wherein the performing pixel evaluation includes determining that a pixel has a pixel value that is not within a range of gray edge pixel values, and determining one of the pixel has a pixel value that is within a range of foreground pixel values and the pixel has a pixel value that is not within a range of foreground pixel values; and
wherein the revising includes one of changing the tag state for the pixel having a pixel value that is within a range of foreground pixel values to a foreground tag state and changing the tag state for the pixel having a pixel value that is not within a range of foreground pixel values to a background tag state.

\* \* \* \* \*